United States Patent
Desai et al.

(10) Patent No.: US 11,343,144 B2
(45) Date of Patent: May 24, 2022

(54) DOWNLINK PERFORMANCE OPTIMIZATIONS IN WIRELESS NETWORKS

(71) Applicant: Cisco Technology, Inc., San Jose, CA (US)

(72) Inventors: Vishal S. Desai, San Jose, CA (US); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 16/351,196

(22) Filed: Mar. 12, 2019

(65) Prior Publication Data
US 2020/0295993 A1 Sep. 17, 2020

(51) Int. Cl.
| H04L 41/0816 | (2022.01) |
| H04W 24/02 | (2009.01) |
| H04L 41/16 | (2022.01) |
| H04W 4/38 | (2018.01) |
| H04W 84/12 | (2009.01) |

(52) U.S. Cl.
CPC .......... *H04L 41/0816* (2013.01); *H04L 41/16* (2013.01); *H04W 4/38* (2018.02); *H04W 24/02* (2013.01); *H04W 84/12* (2013.01)

(58) Field of Classification Search
CPC ........ H04L 41/00; H04W 24/00; H04W 4/00; H04W 84/00
See application file for complete search history.

(56) References Cited

U.S. PATENT DOCUMENTS

| 2006/0234757 A1* | 10/2006 | Choi .................... H04W 36/32 455/525 |
| 2011/0134917 A1* | 6/2011 | Glenn .................. G08B 21/182 370/389 |
| 2016/0066283 A1 | 3/2016 | Gusavac et al. |
| 2017/0311166 A1 | 10/2017 | Li et al. |
| 2017/0332256 A1 | 11/2017 | Gupta et al. |
| 2018/0060476 A1* | 3/2018 | Kasch .................. H04W 24/08 |
| 2019/0200246 A1* | 6/2019 | Kerpez ............... H04W 72/082 |
| 2020/0082300 A1* | 3/2020 | Farrar ................... G06N 20/00 |

OTHER PUBLICATIONS

Cisco.com, "Cisco Aironet Active Sensor" <https://www.cisco.com/c/en/us/products/wireless/aironet-active-sensor/index.html> [Accessed Online Feb. 28, 2019].

* cited by examiner

*Primary Examiner* — Jung H Park
*Assistant Examiner* — Sumitra Ganguly
(74) *Attorney, Agent, or Firm* — Patterson + Sheridan, LLP

(57) ABSTRACT

Techniques for wireless optimizations are provided. A first set of values for a set of network benchmarks is received from a sensor device, where the set of network benchmarks define network performance dimensions, and include a number of retries needed to successfully transmit data. A second set of values for the set of network benchmarks is received from a wireless access point. The first set of values is mapped against the second set of values in an n-dimensional space, and an outlier dimension is identified, based on analyzing the mapped first and second sets of values. The wireless access point is then reconfigured, based on the identified outlier dimension.

20 Claims, 7 Drawing Sheets

DOWNLINK PERFORMANCE OPTIMIZATIONS IN WIRELESS NETWORKS

TECHNICAL FIELD

Embodiments presented in this disclosure generally relate to performance optimizations in wireless networks. More specifically, embodiments disclosed herein relate to reducing dimensional misalignment to improve wireless local area network (WLAN) performance.

BACKGROUND

In modern WLAN deployments, radio resources (e.g., access points) can be configured in various ways to optimize performance and improve the overall capacity of the network. These optimizations are typically crafted manually by administrators, which is a time-consuming and difficult process. Further, in most deployments, there are often better configurations that the manual optimization process is unlikely to discover. In some deployments, attempts have been made to develop metric-based optimizations, based on data collected from access points in the deployment. However, these optimizations fail to account for various characteristics of the deployment (and the client devices) which leads to performance gaps.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
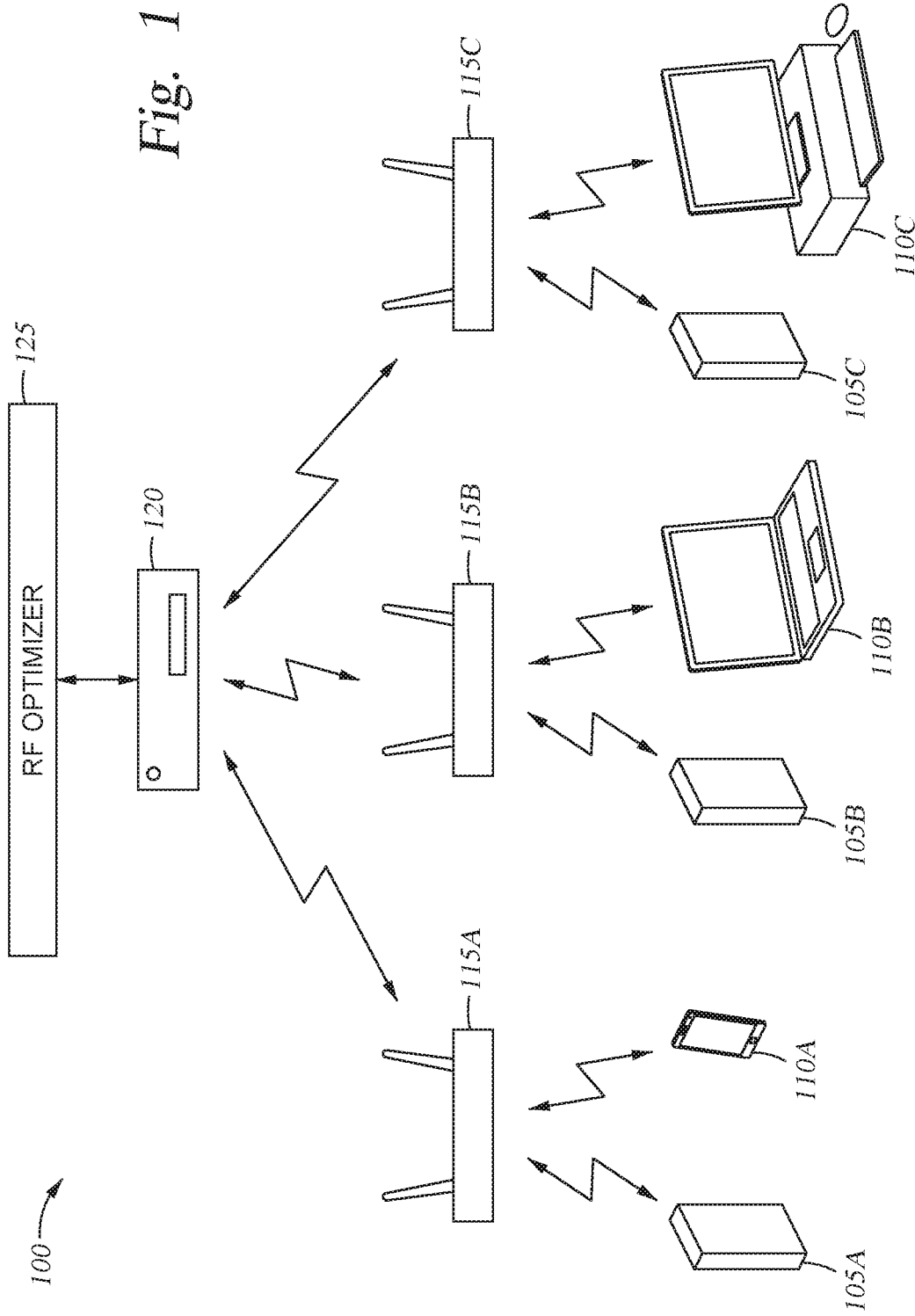
FIG. 1 illustrates an environment configured to implement automatic WLAN optimizations, according to one embodiment disclosed herein.

According to one embodiment of the present disclosure, a method is provided. The method includes receiving, from a sensor device, a first set of values for a set of network benchmarks, wherein the set of network benchmarks define network performance dimensions and include a number of retries needed to successfully transmit data. The method similar includes receiving, from a wireless access point, a second set of values for the set of network benchmarks. Additionally, the method includes mapping the first set of values against the second set of values in an n-dimensional space. The method also includes identifying, based on analyzing the mapped first and second sets of values, an outlier dimension. Finally, the method includes reconfiguring the wireless access point, based on the identified outlier dimension.

According to a second embodiment of the present disclosure, a computer product is provided. The computer product includes logic encoded in a non-transitory medium, the logic executable by operation of one or more computer processors to perform an operation. The operation includes receiving, from a sensor device, a first set of values for a set of network benchmarks, wherein the set of network benchmarks define network performance dimensions and include a number of retries needed to successfully transmit data. The operation similar includes receiving, from a wireless access point, a second set of values for the set of network benchmarks. Additionally, the operation includes mapping the first set of values against the second set of values in an n-dimensional space. The operation also includes identifying, based on analyzing the mapped first and second sets of values, an outlier dimension. Finally, the operation includes reconfiguring the wireless access point, based on the identified outlier dimension.

According to a third embodiment of the present disclosure, a system is provided. The system includes one or more computer processors, and logic encoded in a non-transitory medium. The logic is executable by operation of the one or more computer processors to perform an operation. The operation includes receiving, from a sensor device, a first set of values for a set of network benchmarks, wherein the set of network benchmarks define network performance dimensions, and include a number of retries needed to successfully transmit data. The operation similar includes receiving, from a wireless access point, a second set of values for the set of network benchmarks. Additionally, the operation includes mapping the first set of values against the second set of values in an n-dimensional space. The operation also includes identifying, based on analyzing the mapped first and second sets of values, an outlier dimension. Finally, the operation includes reconfiguring the wireless access point, based on the identified outlier dimension.

Example Embodiments

In many WLAN deployments, radio resources are modified or configured to increase capacity of the network. Generally, these modifications are determined by leveraging network statistics or benchmarks from the perspective of the access point(s), without taking into account the network as it is viewed from the perspective of the client devices or stations. However, relying on this one-sided view of the network fails to account for the fact that radio frequency (RF) conditions are locally significant. That is, owing to a variety of factors including ambient sources of electromagnetic radiation and obstacles such as furniture, walls, humans, animals, and the like, the RF conditions experienced in one area of a physical space (e.g., at floor-level or desk-level in an office) can differ radically from those experienced at a second area (e.g., at the level of the ceiling). In the typical WLAN deployment, the access points are located in an entirely different area (such as in or on the ceiling) than the user equipment (which is generally located nearer the floor, such as on a desk).

Because of these differences, the view of the network, as indicated by statistics collected from the access point(s), is skewed and inaccurate. Further, in existing WLAN deployments, the WLAN system cannot be made aware of this discrepancy, because the access points do not have visibility as to the experience of the client devices. For example, in congested environments, it may require a number of attempts (e.g., retries) to successfully transmit a frame or packet to or from an access point. In one embodiment, the access point can determine how many attempts were made by the access point to successfully transmit a frame or packet to a client (e.g., how many retries). However, in embodiments, the access point does not know how many retries were required for the client to send a frame from the client device to the access point. This is because the frame can only set a single retry bit in the frame, where zero indicates no retries were required, and one indicates that at least one retry was required. Thus, the access point has no understanding as to whether a frame received from the client required a single retry or hundreds of retries.

Embodiments of the present disclosure provide techniques and mechanisms to learn the perspective of the client devices and leverage this feedback to identify outlier dimensions in an n-dimensional model. Based on this model, the WLAN system can better craft improved configurations for the access points, which can reduce congestion and overhead, and improve overall network performance. In some embodiments, the WLAN system utilizes a machine learning system to identify such outliers, as well as to learn policy or configuration modifications that are best able to align the network benchmarks, as seen from each perspective.

FIG. 1 illustrates an environment 100 configured to implement automatic WLAN optimizations, according to one embodiment disclosed herein. In the illustrated embodiment 100, a set of Client Devices 110A-C are connected to one or more Access Points 115A-C. As illustrated, these Access Points 115A-C are controlled and configured via a common control plane provided by a WLAN Controller 120. In embodiments, the Client Devices 110 can include any computing devices, including mobile telephones or smartphones, laptop computers, desktop computers, tablets, embedded devices (e.g., Internet of Things or IoT devices, such as smart appliances), and the like. In the illustrated embodiment, the Access Points 115 provide connectivity among the Client Devices 110, and/or to one or more remote devices or networks (such as the Internet). Although a single Client Device 110 is connected to each Access Point 115 in the illustrated embodiment, in embodiments, any number of Client Devices 110 can be connected to each Access Point 115. Further, although three Access Points 115 are illustrated, there may of course be any number of Access Points 115 in a given deployment.

In an embodiment, the WLAN Controller 120 configures the Access Points 115 in a variety of ways to improve network performance. For example, in one embodiment, the WLAN Controller 120 can adjust the minimum basic rate of each Access Point 115, the rate adaptation algorithm used, the frequency or frequencies utilized, channel width, whether or not beamforming is used, and the like. In embodiments, the WLAN Controller 120 can control any RF configuration or policy that adjusts how the network performs. Although illustrated as a discrete component, in some embodiments, the operations of the WLAN Controller 120 are implemented locally by each Access Point 115. In the illustrated embodiment, an RF Optimizer 125 interacts with the WLAN Controller 120 to dynamically create and modify WLAN configurations, as discussed in more detail below.

Although illustrated as a discrete component, in some embodiments, the RF Optimizer 125 is implemented as a component of the WLAN Controller 120, and/or as a component of one or more Access Points 115. In one embodiment, the RF Optimizer 125 operates as a cloud resource and may interact with multiple WLAN deployments. In an embodiment, the RF Optimizer 125 receives a set of benchmarks (also referred to herein as metrics, statistics, and/or key performance indicators or KPIs) from each Access Point 115 in the deployment. In various embodiments, these benchmarks can include, for example, a total and/or average number of retries required to transmit data from the access point to one or more other devices, the frequency domain of communications received at the access point, channel state information for such communications, a noise floor experienced by the access point, one or more received signal strength indicator(s) (RSSI) for connections between the access point and one or more other devices, the transmission power of the access point, and the like.

In the illustrated embodiment, three Sensors 105A-C are also connected to the WLAN system through the Access Points 115. Although three Sensors 105 are illustrated, in embodiments, the WLAN system can utilize any number of Sensors 105. Further, although the illustrated embodiment includes a single Sensor 105 connected to each Access Point 115, in embodiments, there may be any number of Sensors 105 connected to each Access Point 115. In embodiments, the Sensors 105 collect the same parameters or benchmarks as those collected by the Access Points 115. For example, in one embodiment, the Sensor 105 collects total and/or average retry count for data sent from the Sensor 105 to each Access Point 115. In some embodiments, this count is further on the basis of individual Access Categories (ACs). For example, in one embodiment, user priority is divided into ACs. In such an embodiment, each Sensor 105 can determine, for each Access Point 115 it is connected to, a total or average number of retries required to transmit data at a first level of priority (e.g., a first AC), a total or average number of retries required to transmit data belonging to a second AC, and so on.

In embodiments, the Sensors 105 can similarly collect information such as the frequency domain(s) observed, channel state information, noise floor, user priority, transmit rate of the frame(s), and the like. In some embodiments, each Sensor 105 conducts its own tests (e.g., sending and receiving test packets to and from the Access Points 115) in order to gather these benchmarks. In one embodiment, the Sensors 105 can similarly detect traffic from other stations (e.g., Client Devices 110) to and from Access Points 115, and gather such benchmarks for this traffic as well. In embodiments, the Sensors 105 are located in the physical space such that they see the WLAN network nearer to the perspective of the Client Devices 110, as compared to the perspective of the Access Points 115. For example, if the Client Devices 110 are expected to be located on or near the floor or desk area, the Sensors 105 are placed in such locations, to mimic the conditions experienced by the Client Devices 110. That is, in an embodiment, the Sensors 105 are placed in the physical space such that they are relatively nearer to the Client Devices 110 than to the Access Points 115 (e.g., such that they are similarly situated to the Client Devices 110).

In embodiments, each Sensor 105 forwards this collected network benchmark data to the RF Optimizer 125, through the Access Points 115. In the illustrated embodiments, the Sensors 105 are discrete devices. In some embodiments, one or more of the Sensors 105 can be implemented as software or hardware components on another computing device. For example, in one embodiment, one or more of the Client Devices 110 include software or hardware that performs the functionality of a Sensor 105, collecting network benchmark information. In such an embodiment, the Sensor 105 may transmit test packets or may observe conditions experienced by the Client Device 110 in ordinary use. Similarly, in such an embodiment, the Client Device 110 sends these collected benchmarks to the RF Optimizer 125, separately from the ordinary traffic.

Figure 2:
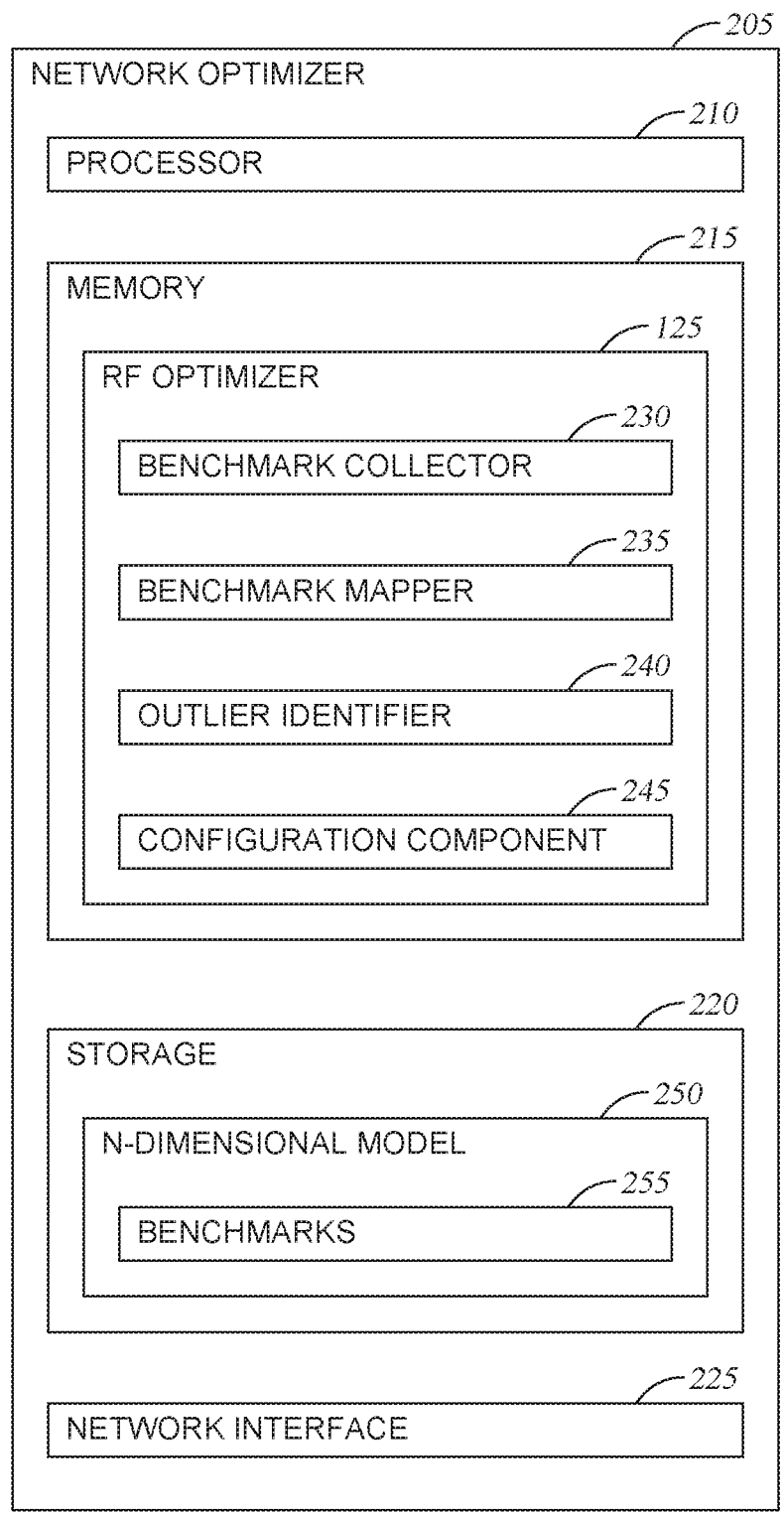
FIG. 2 is a block diagram illustrating a network optimizer, according to one embodiment disclosed herein.

FIG. 2 is a block diagram illustrating a Network Optimizer 205, according to one embodiment disclosed herein. As illustrated, the Network Optimizer 205 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device and may include fixed and/or removable storage devices, such as fixed disk drives, removable memory cards, or optical storage, network attached storage (NAS), or storage area-network (SAN). Via the Network Interface 225, the Network Optimizer 205 can be communicatively coupled with other devices including wireless controllers or access points, devices used by an administrator to configure the Network Optimizer 205, and the like.

As illustrated, the Storage 220 includes an N-Dimensional Model 250. Although illustrated as residing in Storage 220, in embodiments the N-Dimensional Model 250 can be stored in any suitable location, including in Memory 215, or remotely. In the illustrated embodiment, the N-Dimensional Model 250 includes a set of Benchmarks 255, which are collected from Access Point(s) 115, Sensors 105, and/or Client Devices 110. In embodiments, the N-Dimensional Model 250 is a multidimensional representation of the network statistics, benchmarks, and KPIs, as seen from two or more perspectives in the network. In one embodiment, each of the collected Benchmarks 255 corresponds to a dimension in the N-Dimensional Model 250. In such an embodiment, the values collected from the various devices are plotted or mapped in the space along the n dimensions, such that the Network Optimizer 205 can analyze and identify outlier dimensions.

In the illustrated embodiment, the Memory 215 includes an RF Optimizer 125. Although illustrated as a software application residing in Memory 215, in embodiments, the RF Optimizer 125 may be implemented via hardware, software, or as a combination of hardware and software. As illustrated, the RF Optimizer 125 includes several components, including a Benchmark Collector 230, a Benchmark Mapper 235, an Outlier Identifier 240, and a Configuration Component 245. Although depicted as discrete components for illustration, in embodiments, the functionality and operations of the Benchmark Collector 230, Benchmark Mapper 235, Outlier Identifier 240, and Configuration Component 245 may be combined or divided across any number of components.

In an embodiment, the Benchmark Collector 230 collects statistics from Access Points 115, Sensors 105, and/or Client Devices 110. As discussed above, in embodiments these Benchmarks 255 can include the total or average number of retries required to successfully transmit data during a time frame (on a per-AC basis), the perceived RSSI, and the like. In one embodiment, the Benchmark Collector 230 periodically requests and/or receives this information from the devices it monitors (e.g., every minute, every hour, and the like). In one embodiment, the Benchmark Collector 230 aggregates the received data prior to processing it. In some embodiments, the Benchmark Collector 230 aggregates the received benchmarks based on the Access Point 115 to which it corresponds.

For example, in one embodiment, the Benchmark Collector 230 aggregates the data received from Access Points 115 based on the Access Point 115 it was received from. That is, in an embodiment, regardless of which Client Device 110 or Sensor 105 each Access Point 115 was interacting with when the benchmark was collected, the Benchmark Collector 230 aggregates it per Access Point 115. In this way, the Benchmark Collector 230 can determine the aggregate relevant statistics (e.g., the total or average number of retries) for each Access Point 115. Further, in one embodiment, the Benchmark Collector 230 aggregates data received from Sensors 105 and/or Client Devices 110 based on which Access Point 115 the data relates to. For example, if a Sensor 105 reports benchmarks or statistics for a number of connections (e.g., to one or more Access Points 115), the Benchmark Collector 230 can aggregate on the same per-Access Point 115 basis, such that the Benchmark Collector 230 can determine, for each Access Point 115, the quality of the connection(s) from the perspective of the Sensors 105.

In some embodiments, this data is further grouped based on specific categories (e.g., based on the relevant AC for each benchmark, user priority, and the like). In one embodiment, the data can be further sliced and aggregated based on factors including the time of day when it was recorded, the client load at the time, the amount of traffic at the time, and the like. In one embodiment, when the benchmarks are mapped to the n-space represented in the N-Dimensional Model 250, this data is maintained, such that the data can be filtered, grouped, or sorted based on any number of factors including the time it was collected, the Access Point 115 it relates to, the network load at the time, and the like.

In the illustrated embodiment, the Benchmark Mapper 235 receives this collected and/or aggregated benchmark data from the Benchmark Collector 230, and maps it to the N-Dimensional Model 250. In one embodiment, this includes determining, for each collected statistic, the corresponding dimension in the N-Dimensional Model 250. The Benchmark Mapper 235 then plots the data as appropriate in the model. In one embodiment, the data collected by the Access Points 115 (referred to herein as the ceiling-level statistics, perspective, or view) is graphed in the N-Dimensional Model 250 as one set of data, and the information collected from Sensors 105 (also referred to as the floor-level statistics, perspective, or view) is plotted in the same N-Dimensional Model 250, but labeled as a second set of data. In this way, the model represents two distinct perspectives of the network benchmarks: the view provided by the Access Points 115, and the view provided by the Sensors 105.

In an embodiment, once the data is plotted in the N-Dimensional Space 250, the Outlier Identifier 240 analyzes the mapped data to identify any outlier dimensions. As used herein, an outlier dimension is a dimension in the N-Dimensional Model 250 where the ceiling-level view is not aligned with the floor-level view. In one embodiment, to identify these outlier dimensions, the Outlier Identifier 240 utilizes models such as k-means with minimum description length and linearization. In embodiments, the Outlier Identifier 240 can utilize any suitable techniques, including clustering, predefined thresholds or variances, and the like. In an embodiment, once an outlier dimension is identified, the Outlier Identifier 240 determines the corresponding network benchmark (e.g., the statistic that corresponds to the identified dimension), and labels this benchmark as an outlier or problematic statistic. For example, if the number of retries from the perspective of the Access Points 115 is significantly lower than the number of retries from the perspective of the Sensors 105, the Outlier Identifier 240 can label the "retries" benchmark as suspect, or as an outlier.

In one embodiment, the Outlier Identifier 240 determines such outlier dimensions and benchmarks on a per-Access Point 115 basis. That is, a given statistic may be identified as an outlier with respect to one Access Point 115, but not an outlier with respect to a different Access Point 115. Further, in some embodiments, the Outlier Identifier 240 further determines the outlier dimensions on a per-AC basis (such that a benchmark may be problematic for a first level of priority, but not for a second level of priority), on the basis of the time the data was collected (such that the benchmark may be problematic at some times, but not so at others), and the like. In embodiments, any number of factors may be used to identify outlier dimensions based on cell condition groups.

In the illustrated embodiment, the Configuration Component 245 receives an indication of these problematic benchmarks, and generates one or more updated configurations for any Access Points 115 that are experiencing misaligned benchmarks. In one embodiment, the Configuration Component 245 uses predefined rules or mappings that provide suggested configurations for each misaligned benchmark. That is, in one embodiment, the Configuration Component 245 uses a mapping that specifies, for each type of network benchmark misalignment, a suggested RF parameter (or a suggested RF parameter change) for the affected Access Points 115.

In some embodiments, the Configuration Component 245 uses machine learning to generate the updated configurations. In one embodiment, the Configuration Component 245 uses the identified outlier statistics as input to a machine learning model, where the model generates a proposed configuration as output. In an embodiment, after the proposed changes are implemented, the Configuration Component 245 further collects additional statistics from the Access Points 115 and/or Sensors 105 to determine what effect the change had, if any. In an embodiment, changes that led to positive results (e.g., changes that caused the misalignment between the floor-level perspective and the ceiling-level perspective to be reduced) are re-injected into the machine learning model as valid or effective corrective actions. Similarly, in an embodiment, changes that had no effect (or had a negative effect) can have their weight reduced, such that the model is less likely to suggest these changes in the future.

Figure 3A:
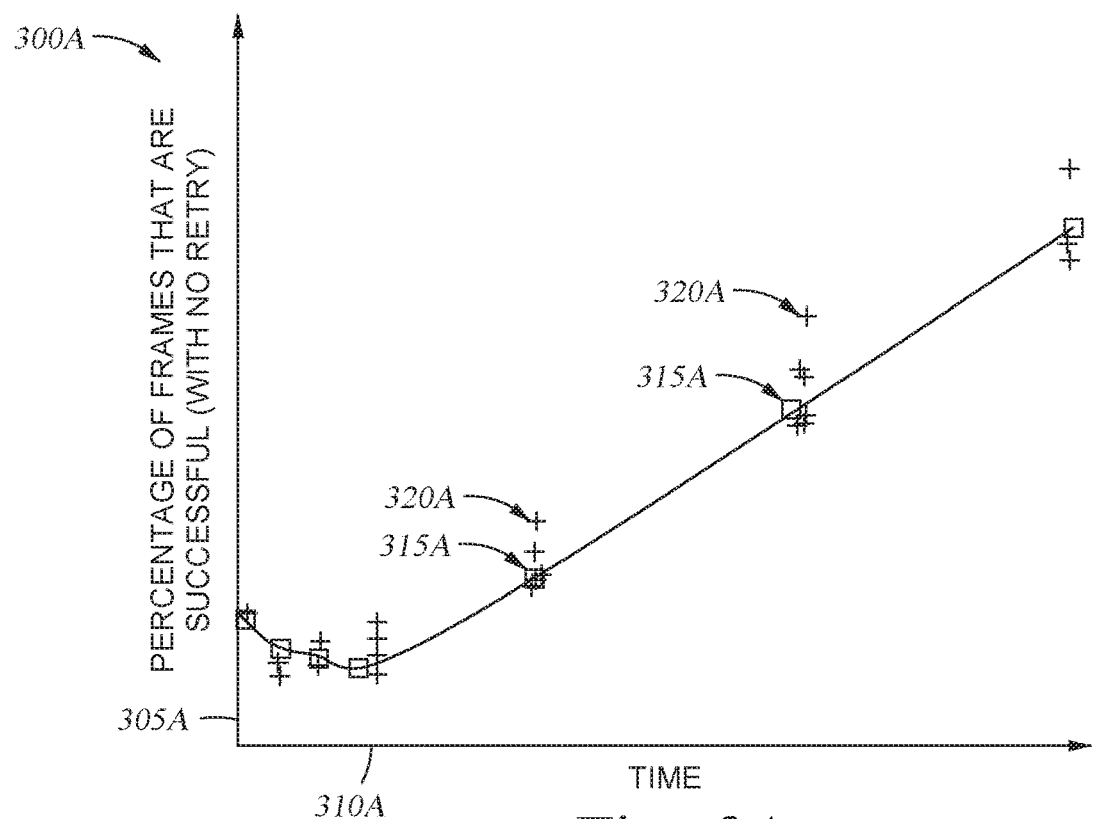
FIGS. 3A and 3B illustrate network benchmarks mapped in a two-dimensional space, according to one embodiment disclosed herein.

FIG. 3A illustrates network benchmarks mapped in a two-dimensional space, according to one embodiment disclosed herein. In the illustrated embodiment, the graph is a Two-Dimensional Model 300A (e.g., an N-Dimensional Model 250 where n=2). Specifically, the dimension plotted on the y-axis 305A corresponds to the percentage of frames that were successfully sent on the first attempt (e.g., with zero retries attempted), while the dimension plotted along the x-axis 310A corresponds to the time at which the data was gathered. Further, in the illustrated embodiment, the ceiling-level perspective (e.g., the data collected by one or more Access Points 115) is plotted using squares and a solid line 315A, while the floor-level perspective (e.g., the data collected by one or more Sensors 105) is plotted using plus marks 320A. As illustrated, in the graphed Two-Dimensional Model 300A, the floor-level perspective is aligned with the ceiling-level perspective at each time interval. That is, in the illustrated embodiment, the percentage of retries, as experienced by the devices near the floor of the environment, is roughly the same as the percentage seen by the access points.

Figure 3B:
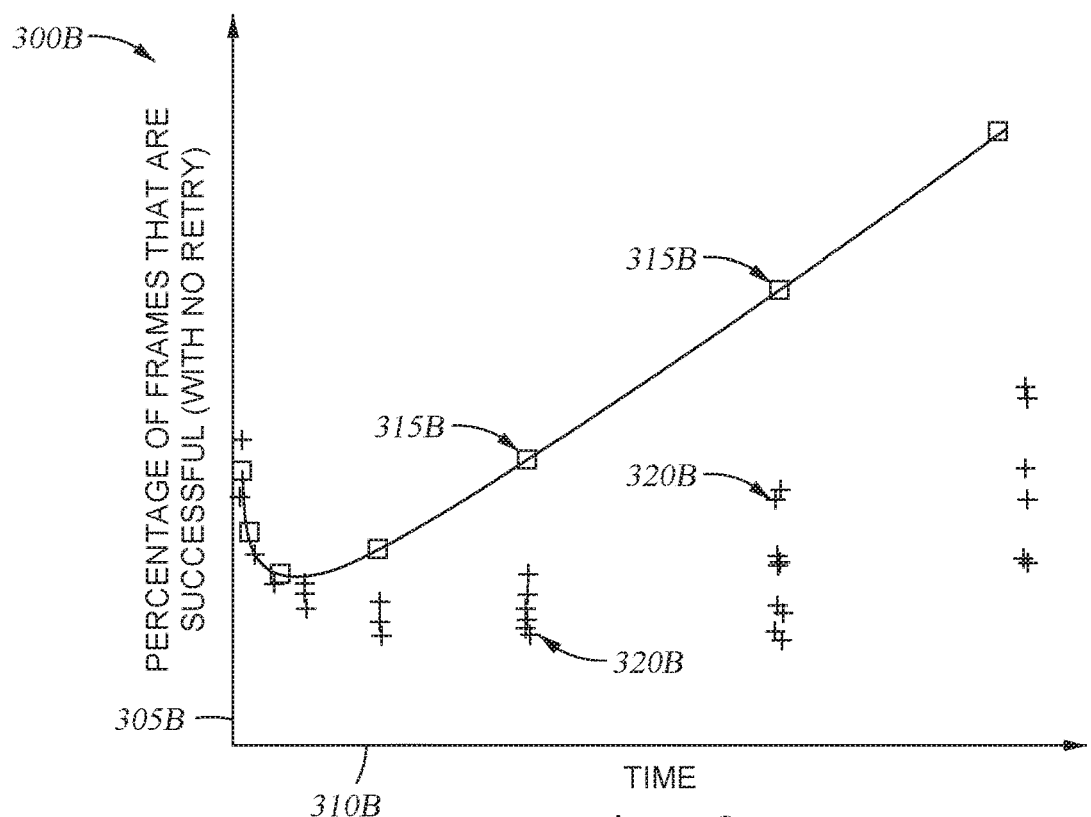

FIG. 3B illustrates network benchmarks mapped in the same two-dimensional space, according to one embodiment disclosed herein. In the illustrated embodiment, the graph is a Two-Dimensional Model 300B (e.g., an N-Dimensional Model 250 where n=2). In embodiments, the Two-Dimensional Model 300B may include data collected relative to a different Access Point 115 than the data graphed in the Two-Dimensional Model 300A. Alternatively, the Two-Dimensional Model 300B may include data collected from the same Access Point 115 but at a different time (e.g., later in the day, or on a different day) than the data included in the Two-Dimensional Model 300A.

In the illustrated embodiment, the dimension plotted on the y-axis 305B still corresponds to the percentage of frames that were successfully sent on the first attempt (e.g., with zero retries attempted), while the dimension plotted along the x-axis 310B similarly corresponds to the time at which the data was gathered. Further, in the illustrated embodiment, the ceiling-level perspective (e.g., the data collected by one or more Access Points 115) is still plotted using squares and a solid line 315B, while the floor-level perspective (e.g., the data collected by one or more Sensors 105) is plotted using plus marks 320B. As illustrated, in the graphed Two-Dimensional Model 300B, the floor-level perspective is not aligned with the ceiling-level perspective for at least some of the time intervals recorded. That is, in the illustrated embodiment, the percentage of retries, as experienced by the devices near the floor of the environment, is roughly the same as the percentage seen by the access points for some times, but differs significantly during some other times.

In an embodiment, based on analyzing the Two-Dimensional Model 300B, the Outlier Identifier 240 can determine that the "percentage of retries" dimension, which corresponds to the "retry" benchmark, is an outlier during one or more of the graphed time intervals. Based on this determination, the Configuration Component 245 can determine that, during the identified times, the configuration of the Access Point 115 should be changed to attempt to mitigate this misalignment. As discussed above, in embodiments, the Configuration Component 245 may generate updated configurations using predefined rules or mappings, using one or more trained machine learning models, or any other suitable technique.

Figure 4A:
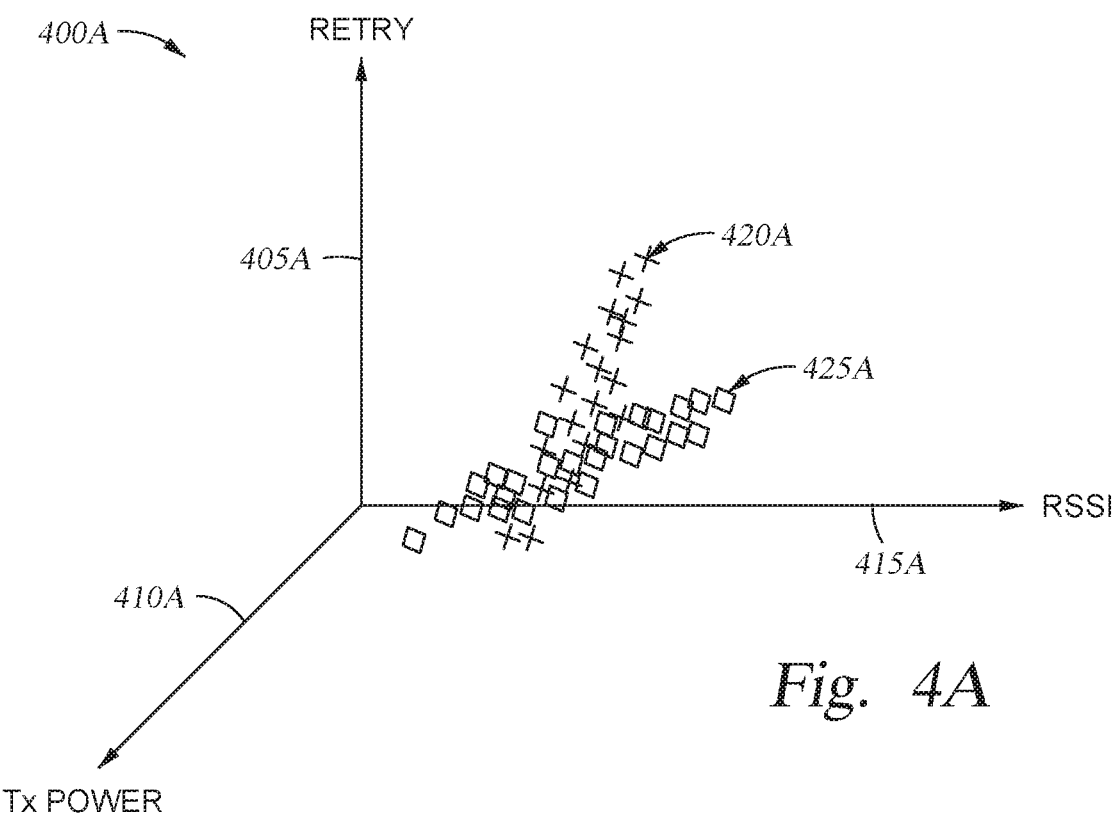
FIGS. 4A and 4B illustrate network benchmarks mapped in a three-dimensional space, according to one embodiment disclosed herein.

FIG. 4A illustrates network benchmarks mapped in a three-dimensional space, according to one embodiment disclosed herein. In the illustrated embodiment, the graph is a Three-Dimensional Model 400A (e.g., an N-Dimensional Model 250 where n=3). Specifically, the dimension plotted on the y-axis 405A corresponds to the number of retries required to successfully transmit data, while the dimension plotted along the x-axis 415A corresponds to the RSSI, and the dimension along the z-axis 410A corresponds to the transmission power associated with each data point. Further, in the illustrated embodiment, the ceiling-level perspective (e.g., the data collected by one or more Access Points 115) is plotted using squares 425A, while the floor-level perspective (e.g., the data collected by one or more Sensors 105) is plotted using plus marks 420A. As illustrated, in the graphed Three-Dimensional Model 400A, the floor-level perspective is not aligned with the ceiling-level perspective for at least some data points. That is, with respect to at least some transmission power and RSSI values, the number of retries is higher from the perspective of the Sensors 105, relative to the perspective of the Access Points 115.

In an embodiment, based on this identified outlier dimension, the Configuration Component 245 can generate one or more proposed or suggested revised configurations for the Access Point 115 the data corresponds to. In the illustrated embodiment, the Access Point 115 is using beamforming. In one embodiment, based on the predefined rules and/or a machine learning model, the Configuration Component 245 can disable beamforming, in order to determine what effect (if any) this configuration change has on the Three-Dimensional Model 400A.

Figure 4B:
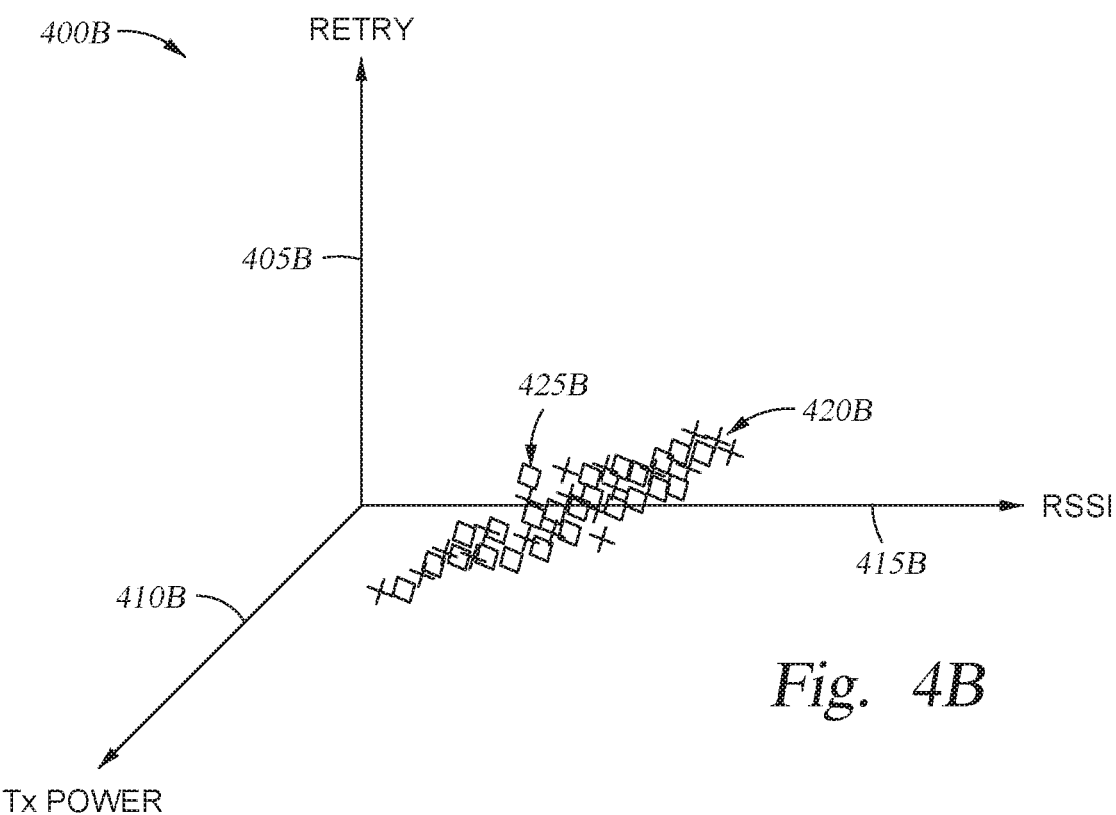

FIG. 4B illustrates the same network benchmarks mapped in a three-dimensional space, according to one embodiment disclosed herein. Specifically, in the illustrated embodiment, the Three-Dimensional Model 400B corresponds to the same Access Point 115 and time of day, but with beamforming disabled. As illustrated, this configuration change has resulted in improved alignment between the ceiling-level perspective and the floor-level perspective. In one embodiment, based on this determination, the Configuration Component 245 refines its machine learning models (e.g., to increase a weight associated with the suggestion to turn off beamforming, if the RSSI and transmission power are similar to the indicated data points). In this way, if conditions appear similar for a different Access Point 115 or at a different time, the Configuration Component 245 is more likely to generate an updated configuration with beamforming disabled.

Figure 5:
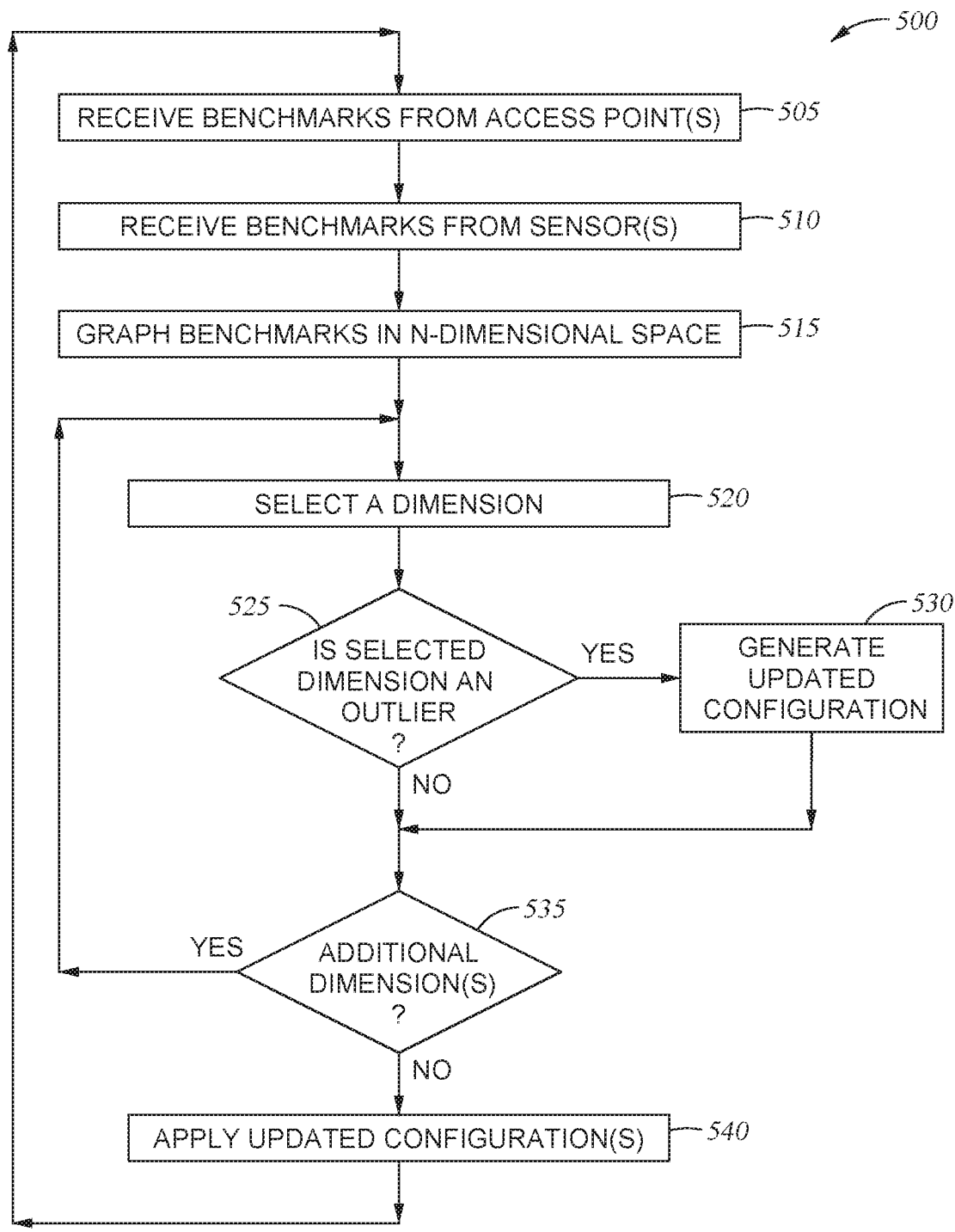
FIG. 5 is a flow diagram illustrating a method for generating and applying improved network configurations, according to one embodiment disclosed herein.

FIG. 5 is a flow diagram illustrating a method 500 for generating and applying improved network configurations, according to one embodiment disclosed herein. The method 500 begins at block 505, where an RF Optimizer 125 receives one or more benchmarks from one or more Access Points 115 in a WLAN deployment in a physical environment. At block 510, the RF Optimizer 125 similarly receives one or more benchmarks from one or more Sensors 105 in the physical environment. In one embodiment, the Sensors 105 are located relatively nearer to client devices (or where client devices are expected to be), as compared to the Access Points 115. In this way, the benchmarks from the Sensors 105 more accurately approximate the RF experience of actual client devices.

The method 500 then proceeds to block 515, where the RF Optimizer 125 graphs the received benchmarks in an N-dimensional space, where each received benchmark corresponds to a dimension. In some embodiments, the RF Optimizer 125 graphs the benchmarks on a per-access point basis, such that each access point can be evaluated in turn. In one embodiment, the RF Optimizer 125 can further refine the mapping in order to see how the perspectives shift when various factors are controlled, such as the time at which the data was recorded, the current load on the network, and the like. At block 520, the RF Optimizer 125 selects one of the dimensions in the n-dimensional model. The method 500 then proceeds to block 525.

At block 525, the RF Optimizer 125 determines whether the selected dimension is an outlier dimension. In embodiments, the RF Optimizer 125 can utilize, for example, k-means with minimum description length, linear regression, clustering, predefined thresholds, or any other techniques to identify such outliers. In embodiments, outlier dimensions are dimensions in the n-dimensional model where the RF Optimizer 125 determines that the ceiling-level perspective differs from the floor-level perspective in a meaningful way. If the RF Optimizer 125 determines that the selected dimension is an outlier, the method 500 proceeds to block 530, where the RF Optimizer 125 generates an updated configuration for the Access Point(s) 115 that the data is relevant for. In embodiments, this may include using predefined rules or mappings, using a machine learning model, and the like. The method 500 then proceeds to block 535.

Returning to block 525, if the RF Optimizer 125 determines that the selected dimension is not an outlier dimension, the method 500 proceeds to block 535. At block 535, the RF Optimizer 125 determines whether there is at least one additional dimension remaining to be analyzed, with respect to the Access Point(s) 115 that are currently being analyzed. That is, in some embodiments, the RF Optimizer 125 repeats the method 500 for each Access Point 115 (and/or for each AC or priority group) in the deployment. If there is at least one dimension in the n-dimensional space that has not yet been analyzed, the method 500 returns to block 520. Otherwise, the method 500 continues to block 540, where the RF Optimizer 125 applies the generated updated configuration(s).

In the illustrated embodiment, the RF Optimizer 125 generates configuration updates for each individual outlier dimension. That is, in the illustrated embodiment, the RF Optimizer 125 determines, for each individual outlier dimension, a corresponding configuration change (or, in some embodiments, no proposed change). In embodiments, these configuration changes can include, for example, enabling or disabling features or channels, modifying RF parameters, and the like. In some embodiment, however, the RF Optimizer 125 first identifies all outlier dimensions and then generates a single updated configuration, based on all of the identified outliers. That is, in some embodiments, the RF Optimizer 125 determines an aggregate optimal configuration, taking into account each outlier dimension.

Once the updated configuration(s) have been applied, in an embodiment, the method 500 returns to block 505 to begin again. In some embodiments, the method 500 is repeated periodically (e.g., every five minutes, every hour, etc.). In one embodiment, each time the method 500 is repeated, data collected over the last predefined interval of time are utilized to generate the updated configurations for the next period of time. In this way, the RF Optimizer 125 dynamically responds to the shifting RF environment (e.g., as electromagnetic interference changes, obstacles move, load shifts, and the like), based on comparing two or more network perspectives (e.g., the perspective of the Access Points 115, and the perspective of the floor-level devices). In embodiments, the network performance and consistency is thereby improved.

Figure 6:
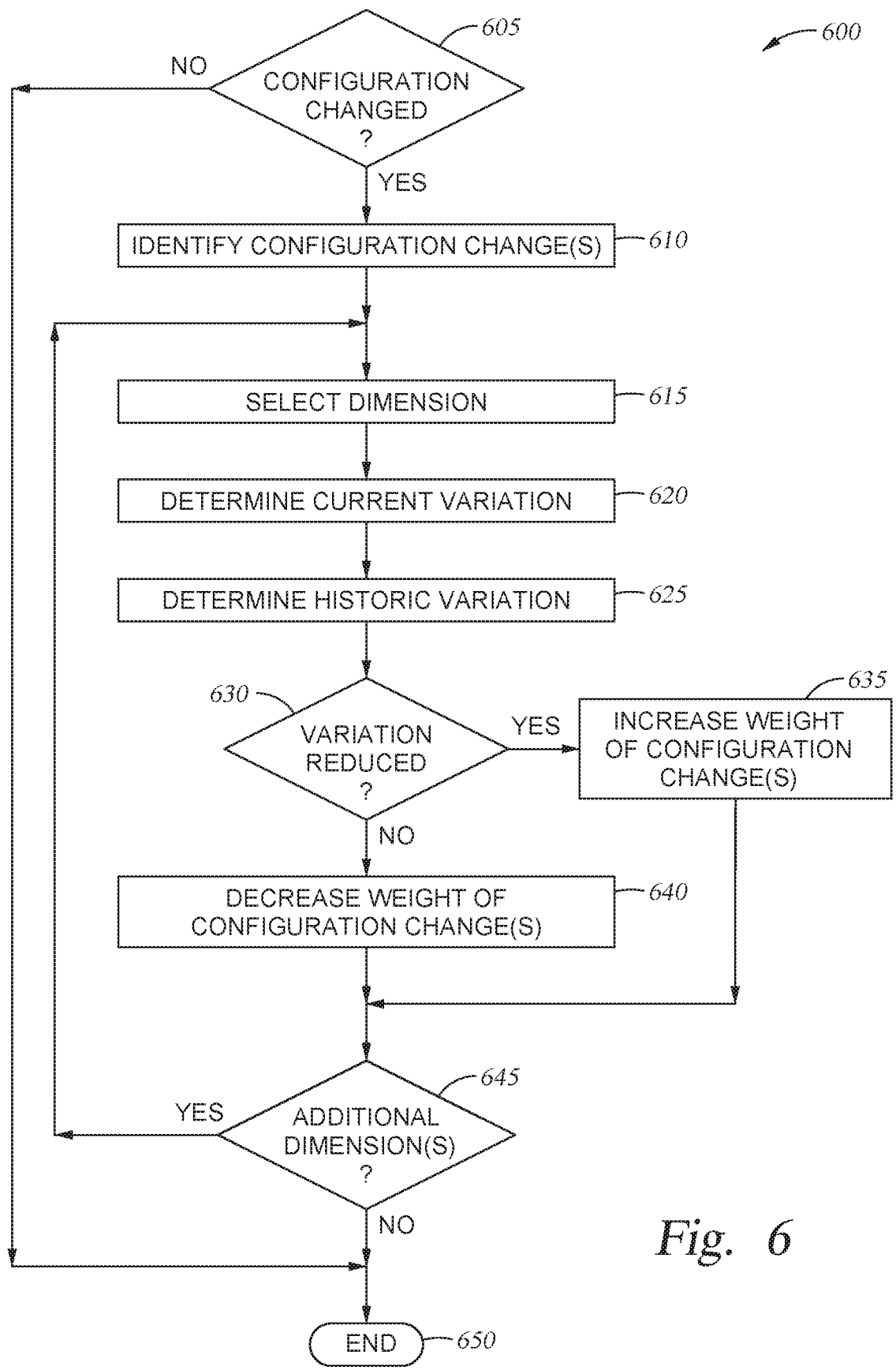
FIG. 6 is a flow diagram illustrating a method for dynamically monitoring network performance to improve generation of updated network configurations, according to one embodiment disclosed herein.

FIG. 6 is a flow diagram illustrating a method 600 for dynamically monitoring network performance to improve generation of updated network configurations, according to one embodiment disclosed herein. In the illustrated embodiment, the method 600 begins after the network benchmarks have been mapped to the n-dimensional space. In one embodiment, the method 600 is repeated at predefined intervals (e.g., whenever the access points are reconfigured). Similarly, in some embodiments, the method 600 is repeated for each Access Point 115 in the deployment. At block 605, the RF Optimizer 125 whether the configuration of the Access Point 115 was changed during the last interval. If not, the method terminates at block 650 (e.g., the RF Optimizer 125 proceeds to process the next Access Point 115). If so, however, the method 600 continues to block 610.

At block 610, the RF Optimizer 125 determines what configuration change (or changes) was made for the last interval. For example, the RF Optimizer 125 can determine whether any radios were enabled or disabled, whether beamforming was enabled or disabled, what the basic data rate was set to, and the like. The method 600 then proceeds to block 615, where the RF Optimizer 125 selects one of the dimensions from the n-dimensional model. At block 620, the RF Optimizer 125 determines a current variation in the selected dimension. That is, the RF Optimizer 125 determines the difference in the model between the ceiling-level perspective and the floor-level perspective, with respect to the currently selected dimension. For example, if the current dimension is "retries," the RF Optimizer 125 determines a magnitude of the difference between the retries as reported by the Access Points 115, and the retries as reported by the Sensors 105.

The method 600 then proceeds to block 625, where the RF Optimizer 125 determines the historic variation for the selected dimension. In one embodiment, this includes determining the variation during the immediately previous time interval (e.g., before the identified configuration change(s) were implemented). At block 630, the RF Optimizer 125 determines whether the variation has been reduced (e.g., whether the magnitude of the current variation is less than the magnitude of the historical variation). If so, the RF Optimizer 125 determines that the configuration change has improved network performance (e.g., by aligning the metrics from each perspective), and the method 600 continues to block 635, where the RF Optimizer 125 increases the weight associated with the determined configuration change(s).

In one embodiment, increasing the weight associated with the change includes refining one or more machine learning models, with respect to the selected dimension. That is, in one embodiment, a configuration change may be associated with different weights based on the dimension being considered. For example, a first configuration change may be associated with positive effects for a first dimension (e.g., it tends to align the metrics for that dimension), but negatively associated with a second dimension (e.g., it tends to make the alignment worse for that benchmark). In an embodiment, increasing the weight of the configuration change makes the RF Optimizer 125 more likely to propose or generate the same change in the future, if the outlier dimensions are similar to the current variances. The method 600 then continues to block 645.

Returning to block 630, if the RF Optimizer 125 determines that the variance has not been reduced, the method 600 proceeds to block 640, where the RF Optimizer 125 decreases the weight associated with the configuration change(s). In one embodiment, this decrease is performed with respect to the selected dimension (e.g., indicating that the configuration change negatively affects the selected dimension). In some embodiments, if the variance has not changed (or the difference is below a threshold), the RF Optimizer 125 does not modify the weight(s) associated with the configuration update. In an embodiment, reducing the weight associated with the configuration change causes the RF Optimizer 125 to be less likely to suggest this change in the future, with respect to the variance in the selected dimension. The method 600 then proceeds to block 645.

In some embodiments, the magnitude of the weight increase or decrease is based on the magnitude of the difference between the current variation and the historic variation. In one embodiment, the weight increase or decrease is based in part on the difference between the current historic variation and perfect alignment. That is, in one embodiment, even if a configuration change has improved the alignment in the selected dimension, if the metrics are still significantly misaligned, the configuration change can be associated with a lower weight than if the configuration change brought the benchmarks into close alignment between the perspectives.

At block 645, the RF Optimizer 125 determines whether there is at least one additional dimension to be considered. If so, the method 600 returns to block 615, such that the models used are updated with respect to each dimension. In some embodiments, the method 600 analyzes all dimensions, regardless of whether each was an outlier or not. In this way, the RF Optimizer 125 can assign lower (or negative) weights to configuration changes that caused previously-aligned dimensions to become less aligned. If no dimensions remain, the method 600 terminates at block 650.

In some embodiments, the method 600 is repeated each time interval (e.g., each time the configuration(s) change). In one embodiment, the method 600 is also repeated for each Access Point 115. In an embodiment, there is a distinct machine learning model trained and used for each such Access Point 115. In such an embodiment, configuration changes are generated for each Access Point 115 using a machine learning model trained specifically for that Access Point 115. Thus, in some embodiments, a particular configuration change can be associated with positive weights for a first dimension and a first Access Point 115, and negative weights for the first dimension at a second Access Point 115. In this way, the RF Optimizer 125 can account for the location-specific peculiarities of each Access Point 115, as each point in the physical environment is likely to experience a unique RF environment, and identical configuration changes may be inappropriate.

Figure 7:
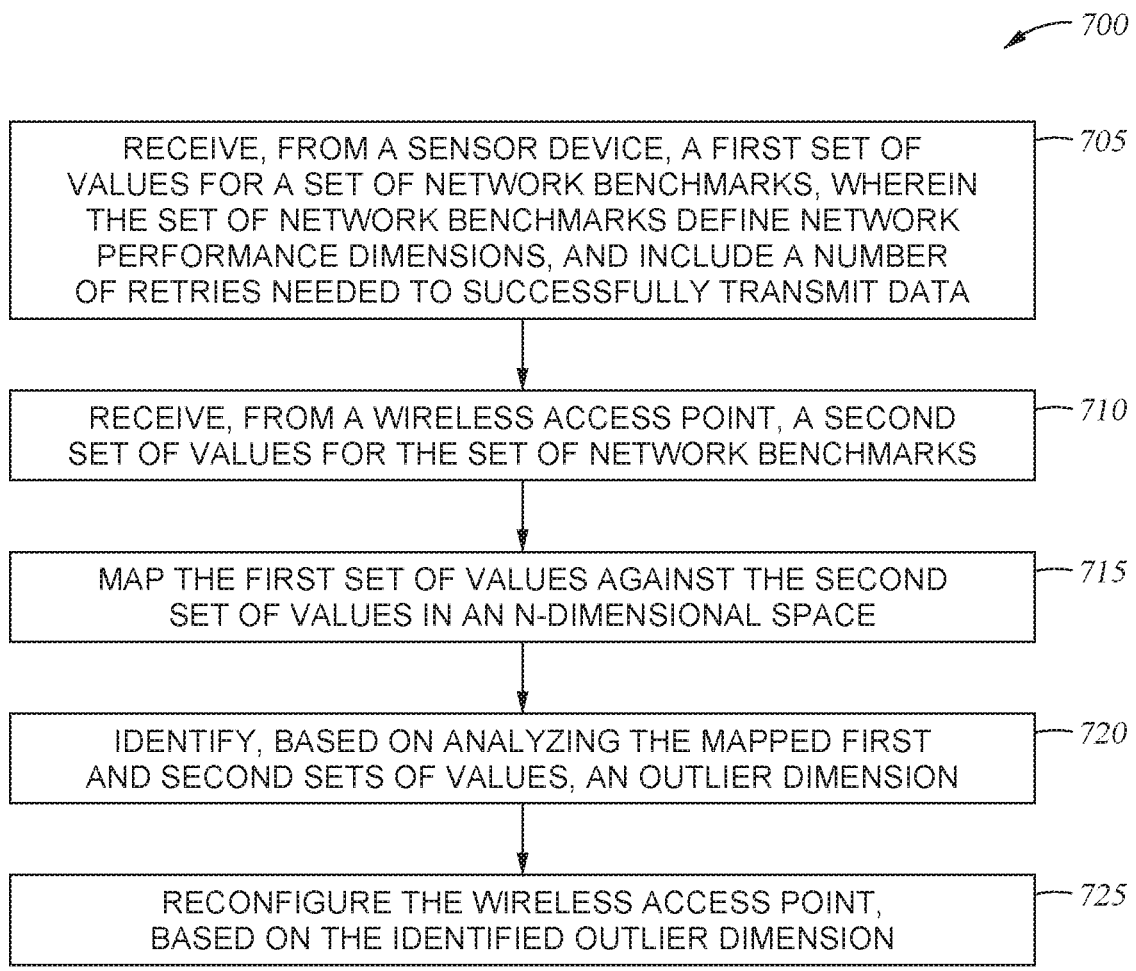
FIG. 7 is a flow diagram illustrating a method for improving network performance, according to one embodiment disclosed herein.

FIG. 7 is a flow diagram illustrating a method 700 for improving network performance, according to one embodiment disclosed herein. The method 700 begins at block 705, where an RF Optimizer 125 receives, from a sensor device, a first set of values for a set of network benchmarks, wherein the set of network benchmarks define network performance dimensions, and include a number of retries needed to successfully transmit data. Similarly, at block 710, the RF Optimizer 125 receives, from a wireless access point, a second set of values for the set of network benchmarks. The method 700 then continues to block 715, where the RF Optimizer 125 maps the first set of values against the second set of values in an n-dimensional space. Further, at block 720, the RF Optimizer 125 identifies, based on analyzing the mapped first and second sets of values, an outlier dimension. Finally, the method 700 continues to block 725, where the RF Optimizer 125 reconfigures the wireless access point, based on the identified outlier dimension.

In the current disclosure, reference is made to various embodiments. However, the scope of the present disclosure is not limited to specifically described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments, and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device, to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving, from a sensor device, a first set of values for a set of network benchmarks from a floor-level perspective, wherein the set of network benchmarks define performance dimensions of a network and include a number of retries needed to successfully transmit data;
receiving, from a wireless access point, a second set of values for the set of network benchmarks from a ceiling-level perspective;
mapping the first set of values as a first set of data points in an n-dimensional space, each respective dimension in the n-dimensional space corresponding to a respective benchmark in the set of network benchmarks;
mapping the second set of values as a second set of data points, distinct from the first set of data points, in the n-dimensional space;
identifying, based on analyzing the mapped first and second sets of data points, an outlier dimension, comprising identifying a network benchmark where the floor-level perspective, as indicated by the first set of data points, and the ceiling-level perspective, as indicated by the second set of data points, differ by more than a threshold; and reconfiguring the wireless access point, based on the identified outlier dimension.

2. The method of claim 1, wherein reconfiguring the wireless access point comprises:

identifying a configurable radio frequency (RF) parameter that may affect the identified outlier dimension;

determining a modification to apply to the configurable RF parameter, based on the identified outlier dimension; and modifying the configurable RF parameter of the wireless access point based on the determined modification.

3. The method of claim 2, the method further comprising, after reconfiguring the wireless access point:

receiving, from the sensor device, a third set of values for the set of network benchmarks;

receiving, from the wireless access point, a fourth set of values for the set of network benchmarks;

determining a first variation between the first and second sets of values with respect to the identified outlier dimension;

determining a second variation between the third and fourth sets of values with respect to the identified outlier dimension; and upon determining that the second variation is greater than the first variation, reducing, in a machine learning model, a weight of the modification.

4. The method of claim 2, the method further comprising, after reconfiguring the wireless access point:

receiving, from the sensor device, a third set of values for the set of network benchmarks;

receiving, from the wireless access point, a fourth set of values for the set of network benchmarks;

determining a first variation between the first and second sets of values with respect to the identified outlier dimension;

determining a second variation between the third and fourth sets of values with respect to the identified outlier dimension; and upon determining that the second variation is less than the first variation, increasing, in a machine learning model, a weight applied to the modification.

5. The method of claim 4, wherein an amount of the increase of the weight applied to the modification is proportional to a difference between the first and second variations.

6. The method of claim 1, wherein the sensor device is located in a first position at a physical site and the wireless access point is located in a second position at the physical site, wherein the first position experiences radio frequency (RF) conditions that are more similar to those experienced by a client device, relative to RF conditions experienced at the second position.

7. The method of claim 1, wherein the first set of values for the set of network benchmarks includes at least one of:

(i) a number of retries needed to successfully transmit data from the sensor device to the wireless access point;

(ii) a frequency domain of communications received by the sensor device from the wireless access point;

(iii) channel state information of communications received by the sensor device from the wireless access point; or (iv) a noise floor experience by the sensor device.

8. The method of claim 1, wherein identifying the outlier dimension comprises analyzing the mapped first and second sets of values using a clustering model.

9. A computer product comprising logic encoded in a non-transitory medium, the logic executable by operation of one or more computer processors to perform an operation comprising:

receiving, from a sensor device, a first set of values for a set of network benchmarks from a floor-level perspective, wherein the set of network benchmarks define performance dimensions of a network and include a number of retries needed to successfully transmit data;

receiving, from a wireless access point, a second set of values for the set of network benchmarks from a ceiling-level perspective;

mapping the first set of values as a first set of data points in an n-dimensional space, each respective dimension in the n-dimensional space corresponding to a respective benchmark in the set of network benchmarks;

mapping the second set of values as a second set of data points, distinct from the first set of data points, in the n-dimensional space;

identifying, based on analyzing the mapped first and second sets of data points, an outlier dimension, comprising identifying a network benchmark where the floor-level perspective, as indicated by the first set of data points, and the ceiling-level perspective, as indicated by the second set of data points, differ by more than a threshold; and reconfiguring the wireless access point, based on the identified outlier dimension.

10. The computer product of claim 9, wherein reconfiguring the wireless access point comprises:

identifying a configurable radio frequency (RF) parameter that may affect the identified outlier dimension;

determining a modification to apply to the configurable RF parameter, based on the identified outlier dimension; and modifying the configurable RF parameter of the wireless access point based on the determined modification.

11. The computer product of claim 10, the operation further comprising, after reconfiguring the wireless access point:

receiving, from the sensor device, a third set of values for the set of network benchmarks;

receiving, from the wireless access point, a fourth set of values for the set of network benchmarks;

determining a first variation between the first and second sets of values with respect to the identified outlier dimension;

determining a second variation between the third and fourth sets of values with respect to the identified outlier dimension; and upon determining that the second variation is greater than the first variation, reducing, in a machine learning model, a weight of the modification.

12. The computer product of claim 10, the operation further comprising, after reconfiguring the wireless access point:

receiving, from the sensor device, a third set of values for the set of network benchmarks;

receiving, from the wireless access point, a fourth set of values for the set of network benchmarks;

determining a first variation between the first and second sets of values with respect to the identified outlier dimension;

determining a second variation between the third and fourth sets of values with respect to the identified outlier dimension; and upon determining that the second variation is less than the first variation, increasing, in a machine learning model, a weight applied to the modification.

13. The computer product of claim 9, wherein the sensor device is located in a first position at a physical site and the wireless access point is located in a second position at the physical site, wherein the first position experiences radio frequency (RF) conditions that are more similar to those experienced by a client device, relative to RF conditions experienced at the second position.

14. The computer product of claim 9, wherein the first set of values for the set of network benchmarks includes at least one of:
 (i) a number of retries needed to successfully transmit data from the sensor device to the wireless access point;
 (ii) a frequency domain of communications received by the sensor device from the wireless access point;
 (iii) channel state information of communications received by the sensor device from the wireless access point; or
 (iv) a noise floor experience by the sensor device.

15. A system comprising:
one or more computer processors; and
logic encoded in a non-transitory medium, the logic executable by operation of the one or more computer processors to perform an operation comprising:
 receiving, from a sensor device, a first set of values for a set of network benchmarks from a floor-level perspective, wherein the set of network benchmarks define performance dimensions of a network and include a number of retries needed to successfully transmit data;
 receiving, from a wireless access point, a second set of values for the set of network benchmarks from a ceiling-level perspective;
 mapping the first set of values as a first set of data points in an n-dimensional space, each respective dimension in the n-dimensional space corresponding to a respective benchmark in the set of network benchmarks;
 mapping the second set of values as a second set of data points, distinct from the first set of data points, in the n-dimensional space;
 identifying, based on analyzing the mapped first and second sets of data points, an outlier dimension, comprising identifying a network benchmark where the floor-level perspective, as indicated by the first set of data points, and the ceiling-level perspective, as indicated by the second set of data points, differ by more than a threshold; and
 reconfiguring the wireless access point, based on the identified outlier dimension.

16. The system of claim 15, wherein reconfiguring the wireless access point comprises:
 identifying a configurable radio frequency (RF) parameter that may affect the identified outlier dimension;
 determining a modification to apply to the configurable RF parameter, based on the identified outlier dimension; and
 modifying the configurable RF parameter of the wireless access point based on the determined modification.

17. The system of claim 16, the operation further comprising, after reconfiguring the wireless access point:
 receiving, from the sensor device, a third set of values for the set of network benchmarks;
 receiving, from the wireless access point, a fourth set of values for the set of network benchmarks;
 determining a first variation between the first and second sets of values with respect to the identified outlier dimension;
 determining a second variation between the third and fourth sets of values with respect to the identified outlier dimension; and
 upon determining that the second variation is greater than the first variation, reducing, in a machine learning model, a weight of the modification.

18. The system of claim 16, the operation further comprising, after reconfiguring the wireless access point:
 receiving, from the sensor device, a third set of values for the set of network benchmarks;
 receiving, from the wireless access point, a fourth set of values for the set of network benchmarks;
 determining a first variation between the first and second sets of values with respect to the identified outlier dimension;
 determining a second variation between the third and fourth sets of values with respect to the identified outlier dimension; and
 upon determining that the second variation is less than the first variation, increasing, in a machine learning model, a weight applied to the modification.

19. The system of claim 15, wherein the sensor device is located in a first position at a physical site and the wireless access point is located in a second position at the physical site, wherein the first position experiences radio frequency (RF) conditions that are more similar to those experienced by a client device, relative to RF conditions experienced at the second position.

20. The system of claim 15, wherein the first set of values for the set of network benchmarks includes at least one of:
 (i) a number of retries needed to successfully transmit data from the sensor device to the wireless access point;
 (ii) a frequency domain of communications received by the sensor device from the wireless access point;
 (iii) channel state information of communications received by the sensor device from the wireless access point; or
 (iv) a noise floor experience by the sensor device.

* * * * *